United States Patent
Tati et al.

(10) Patent No.: US 10,691,591 B2
(45) Date of Patent: Jun. 23, 2020

(54) EFFICIENTLY PURGING NON-ACTIVE BLOCKS IN NVM REGIONS USING POINTER ELIMINATION

(71) Applicant: VMware, Inc., Palo Alto, CA (US)

(72) Inventors: Kiran Tati, Milpitas, CA (US); Xavier Deguillard, Mountain View, CA (US); Ishan Banerjee, Santa Clara, CA (US); Julien Freche, Mountain View, CA (US); Preeti Agarwal, San Jose, CA (US); Rajesh Venkatasubramanian, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/174,264

(22) Filed: Oct. 29, 2018

(65) Prior Publication Data
US 2020/0133846 A1 Apr. 30, 2020

(51) Int. Cl.
*G06F 13/00* (2006.01)
*G06F 12/02* (2006.01)
*G06F 12/0804* (2016.01)

(52) U.S. Cl.
CPC ...... *G06F 12/0261* (2013.01); *G06F 12/0804* (2013.01); *G06F 2212/1044* (2013.01); *G06F 2212/202* (2013.01)

(58) Field of Classification Search
CPC ............. G06F 12/0261; G06F 12/0804; G06F 2212/1044; G06F 2212/202
See application file for complete search history.

(56) References Cited

U.S. PATENT DOCUMENTS

| | | |
|---|---|---|
| 2011/0066790 A1 | 3/2011 | Mogul |
| 2015/0261463 A1* | 9/2015 | Chakrabarti .......... G06F 9/3863 |
| | | 711/103 |
| 2016/0306574 A1 | 10/2016 | Friedman |
| 2018/0246807 A1* | 8/2018 | Andrei .................. G06F 16/901 |
| 2018/0247947 A1 | 8/2018 | Friedman |
| 2019/0042465 A1* | 2/2019 | Li ........................ G06F 12/0238 |
| 2019/0278508 A1* | 9/2019 | Pepper .................. G06F 3/0652 |

OTHER PUBLICATIONS

Office Action, dated Nov. 22, 2019, from related U.S. Appl. No. 16/174,270.

* cited by examiner

*Primary Examiner* — Jing-Yih Shyu

(57) ABSTRACT

Techniques for efficiently purging non-active blocks in an NVM region of an NVM device using pointer elimination are provided. In one set of embodiments, a host system can, for each level 1 (L1) page table entry of each snapshot of the NVM region, determine whether a data block of the NVM region that is pointed to by the L1 page table entry is a non-active block, and if the data block is a non-active block, remove a pointer to the data block in the L1 page table entry and reduce a reference count parameter associated with the data block by 1. If the reference count parameter has reached zero at this point, the host system purge the data block from the NVM device to the mass storage device.

18 Claims, 14 Drawing Sheets

EFFICIENTLY PURGING NON-ACTIVE BLOCKS IN NVM REGIONS USING POINTER ELIMINATION

CROSS-REFERENCES TO RELATED APPLICATIONS

The present application is related to the following commonly-owned U.S. Patent Applications, filed concurrently herewith:

U.S. patent application Ser. No. 16/174,249, entitled "Efficiently Purging Non-Active Blocks in NVM Regions Using Virtblock Arrays"; and U.S. patent application Ser. No. 16/174,270, entitled "Efficiently Purging Non-Active Blocks in NVM Regions While Preserving Large Pages."

The entire contents of all of the foregoing applications are incorporated herein by reference for all purposes.

BACKGROUND

Non-volatile random access memory (NVM) is an emerging computer memory technology that offers fast, byte-level access to data in a manner similar to volatile random access memory (RAM), but is persistent in nature (i.e., the contents of NVM are saved when system power is turned off or lost). Thus, NVM can be used as both a storage device and as a byte-addressable memory. Computer hardware of the future will likely incorporate large amounts of NVM, possibly as a replacement for traditional volatile RAM.

Some existing hypervisors, such as VMware's ESX Server, are capable of natively managing NVM in a host system. For example, these hypervisors can partition an NVM device into portions referred to as regions and make the regions available for use by virtual machines (VMs). These hypervisors can also create snapshots of NVM regions, which enables various host and cluster-wide reliability and availability capabilities.

One drawback of creating NVM region snapshots is that each snapshot consumes additional NVM space. The amount of NVM consumed by an NVM region snapshot can potentially be as large as the NVM region itself. Accordingly, repeated snapshots can lead to excessive NVM space consumption, resulting in significantly less free NVM for use by VMs and other clients.

SUMMARY

Techniques for efficiently purging non-active blocks in an NVM region of an NVM device using pointer elimination are provided. In one set of embodiments, a host system can, for each level 1 (L1) page table entry of each snapshot of the NVM region, determine whether a data block of the NVM region that is pointed to by the L1 page table entry is a non-active block, and if the data block is a non-active block, remove a pointer to the data block in the L1 page table entry and reduce a reference count parameter associated with the data block by 1. If the reference count parameter has reached zero at this point, the host system purge the data block from the NVM device to the mass storage device.

The following detailed description and accompanying drawings provide a better understanding of the nature and advantages of particular embodiments.

DETAILED DESCRIPTION

Figure 1A:
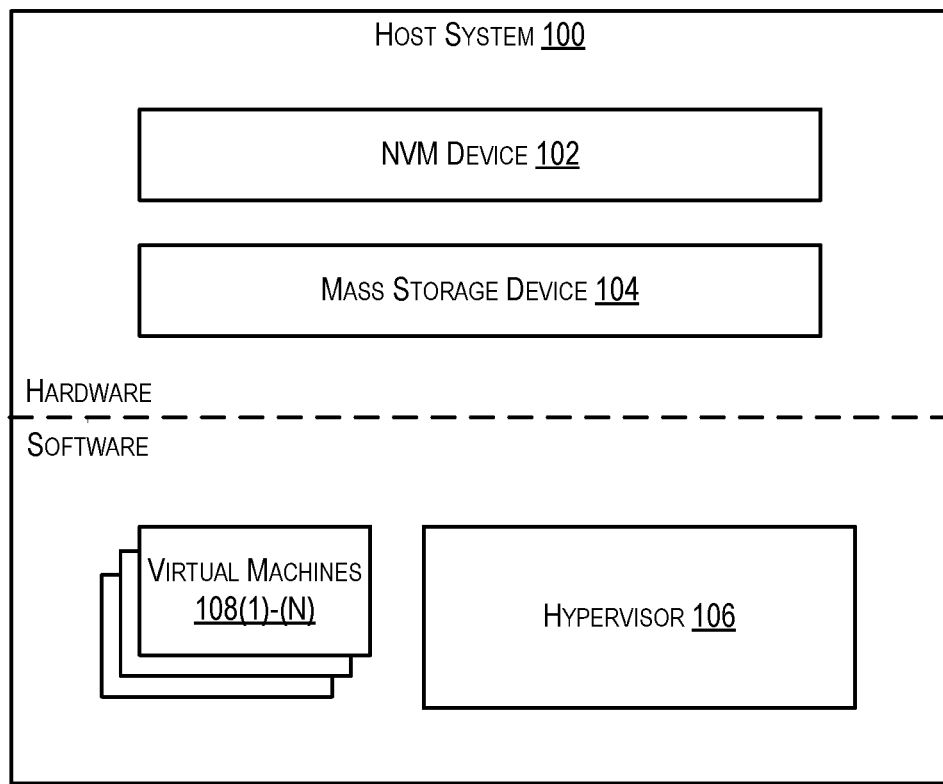
FIG. 1A depicts an example host system in which embodiments of the present disclosure may be implemented.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes techniques that can be implemented by a hypervisor of a host system for efficiently purging non-active blocks of an NVM region from NVM to another storage/memory medium (e.g., a mass storage device). As used herein, a "non-active" block of an NVM region is an NVM data block that is inaccessible via the region's running point; instead, such non-active blocks are only accessible from the context of one or more snapshots created for the region. Thus, the techniques of the present disclosure advantageously free up NVM space that would otherwise be consumed solely by region snapshots.

According to a first set of embodiments (collectively referred to as the "virtblock" approach), the hypervisor can efficiently purge non-active blocks by implementing a new type of NVM region metadata structure known as a virtblock array. This first approach speeds up NVM region metadata updates at the time of purging, but requires additional NVM space for holding the virtblock arrays and slightly increases the cost of copy-on-write (COW) and block access.

According to a second set of embodiments (collective referred to as the "pointer elimination" approach), the hypervisor can efficiently purge non-active blocks by removing pointers in snapshot metadata (i.e., snapshot page tables) that point to non-active blocks during the course of the purge operation. Once a given non-active block is purged to, e.g., mass storage, the page table of the snapshot that owns the data block is updated to point to the storage location, while the page tables of other snapshots that refer to the data block but are non-owners are made to refer to the owner snapshot. This second approach allows purging to be performed via a single pass of an NVM region's snapshot page tables and does not use additional NVM space, but makes snapshot deletion more expensive.

According to a third set of embodiments (collectively referred to as the "large page preservation" approach), the hypervisor can efficiently purge non-active blocks by modifying the way in which pointers are assigned during the COW operation. In particular, at the time of a COW for a NVM data block that is referred to by one or more existing snapshots, the hypervisor can (1) make the page table of the running point of the region point to the existing instance of the data block, (2) make the page table of the snapshot that owns the data block point to the new data block that is allocated as a result of the COW, and (3) make the page tables of other snapshots that refer to the data block but are non-owners refer to the owner snapshot. This third approach preserves large page allocations of contiguous NVM data blocks for the running point which provides performance benefits on the hardware side (e.g., better cache performance for the CPU translation lookaside buffer (TLB)). However, this approach increases the cost of performing a COW and makes snapshot deletion more expensive like the second approach.

The foregoing and other aspects of the present disclosure are described in further detail in the sections that follow.

1. Example Host System and Overview of NVM Region Snapshotting

FIG. 1A is a simplified block diagram of an example host system 100 in which embodiments of the present disclosure may be implemented. As shown, host system 100 includes, in hardware, an NVM device 102 and a mass storage device 104. NVM device 102 may be implemented using, e.g., one or more NVDIMM-N modules, one or more NVMDIMM-P modules, and/or any other type of NVM technology known in the art. Mass storage device 104 may be implemented using one or more magnetic (i.e., spinning) hard disks.

Host system 100 further includes, in software, a hypervisor 106 and a plurality of VMs 108(1)-(N). Hypervisor 106 is a software layer that provides an execution environment in which VMs 108(1)-(N) can run. Examples of existing hypervisors include VMware's ESX Server, Microsoft Hyper-V, and Citrix Xen.

Figure 1B:
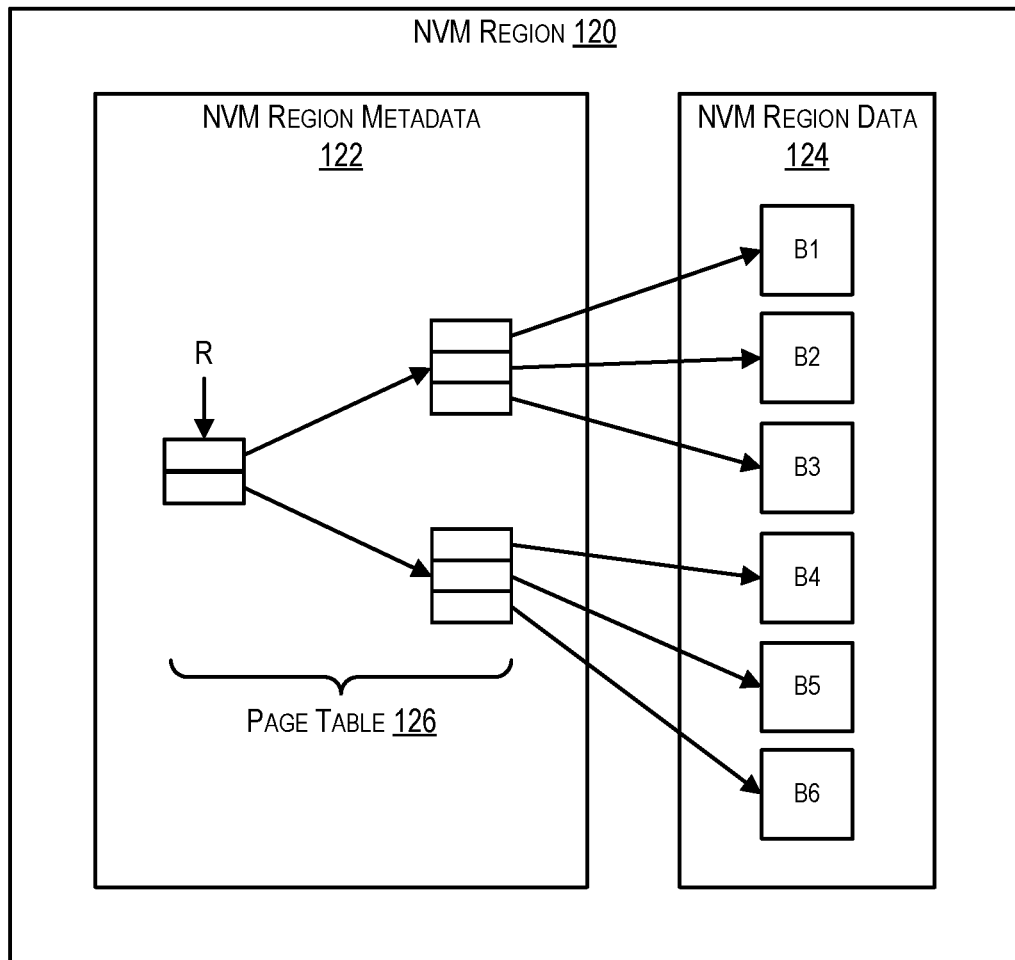
FIGS. 1B, 1C, and 1D are schematic diagrams illustrating the process of snapshotting an NVM region.

As noted in the Background section, certain hypervisors like ESX Server are capable of natively managing the NVM in a host system. These management features include (1) partitioning an NVM device into one or more regions for use by VMs, and (2) taking snapshots of an NVM region, which are read-only copies of the region's data content at various points in time. To illustrate (1), FIG. 1B depicts a schematic representation of NVM device 102 of FIG. 1A where an NVM region 120 has been carved out on the device by hypervisor 106. As shown, NVM region 120 consists of two components: NVM region metadata 122 and NVM region data 124. NVM region metadata 122 includes a multi-level page table 126 that defines a list of data blocks in NVM data 124 which map to the logical address space of NVM region 120. More particularly, the first (i.e., lowest) level of page table 126 includes entries (grouped into pages) that correspond to address offsets of NVM region 120 and that point to physical data blocks in NVM data 124 (e.g., data blocks B1-B6 in this example) which store the data for those address offsets. In various embodiments, each NVM data block can be associated with a "ref count" parameter indicating the number of pointers that directly point to the data block, as well as an "owner" parameter (not shown here, but explained below). The higher levels of page table 126 comprise pages and constituent entries that guide traversal down the page table tree. The total number of levels in page table 126 can vary depending on the implementation and the region address space that needs to be supported. For purposes of the present disclosure, it can be assumed without loss of generality that every NVM region page table is made up of at least two levels: a top level comprising a single root page and a bottom level (referred to herein as level 1 or "L1") comprising multiple pages, where each L1 page includes entries pointing to NVM data blocks.

When hypervisor 106 creates an NVM region such as region 120 and assigns it to a given VM 108, hypervisor 106 creates a pointer to the root page of the region's page table that is called the region's running point. Hypervisor 106 makes this running point available to the VM, which the VM then uses to access and modify the data in the region. In FIG. 1B, the running point of NVM region 120 is indicated by "R," which points to the root page of page table 126. In some scenarios an NVM region may have multiple running points, but this is not a typical use case and thus is not detailed here.

When hypervisor 106 subsequently takes a snapshot of an NVM region, the data content of the region is frozen at that point in time so that the data content cannot be changed. This is achieved by marking the region's page table as read-only and changing the existing running point pointer into a pointer for the snapshot. In addition, a new running point pointer is created that points to the now read-only page table and the new running point is provided to the region's VM.

When the VM later makes a change to the data content of the region via the new running point (e.g., writes to an address offset A corresponding to NVM data block B), a copy-on-write (COW) process is initiated that causes a new copy of data block B (i.e., data block B') to be created/allocated on the NVM device and populated with the write data. This, in turn, causes a new page table to be created in the NVM region metadata that points to new data block B', and the running point is made to point to the root page of the new page table (while the snapshot pointer continues to point to the root page of the original page table). In this way, the snapshot can continue to refer to the original data, while the current running point used by the VM can reference new data block B'.

Figure 1C:
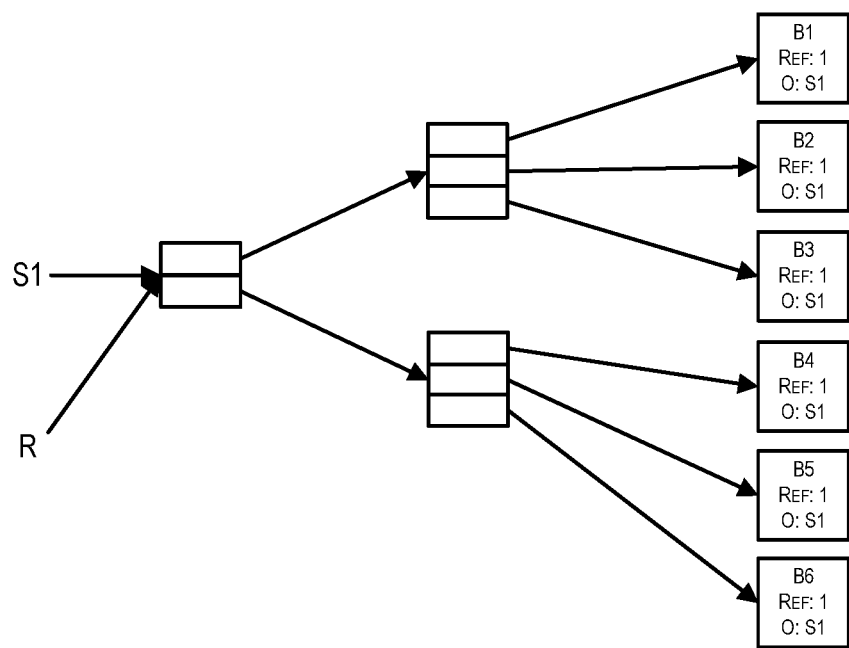
Figure 1D:
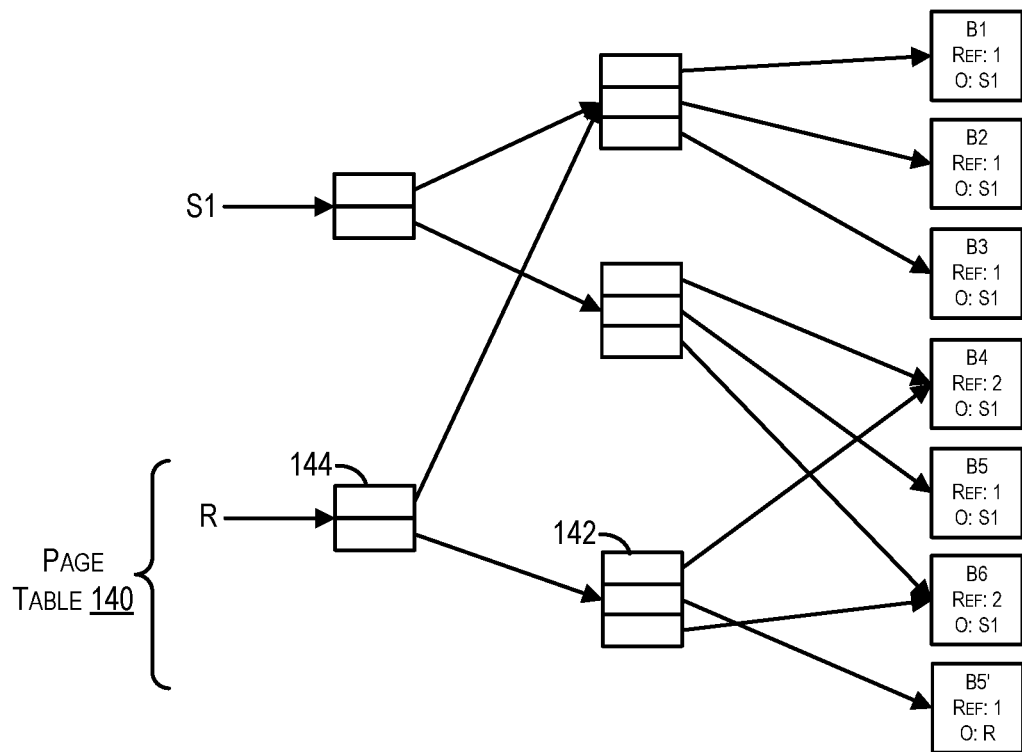

To further clarify this snapshotting process and how COW works, FIG. 1C is a schematic representation of NVM region 120 of FIG. 1B immediately after a first snapshot S1 of the region has been taken, and FIG. 1D is a schematic representation of NVM region 120 after the region's VM has attempted to write new data to data block B5 (subsequently to the creation of snapshot S1). As shown in FIG. 1C, upon taking snapshot S1, the existing running point pointer R is converted into a snapshot pointer S1 and a new running point pointer R is created that points to the root of existing region page table 126. Thus, both S1 and running point R now point to page table 126. Page table 126 is marked as read-only, and the reference count (i.e., "ref count") parameter of each data block B1, B2, B3, B4, B5, and B6 is set to 1 (because each block is pointed to by a single L1 page table entry). Note that, although not shown here, each page in page table 126 may also have a reference count parameter that indicates the number of pointers directly pointing to that page. In addition, since data blocks B1-B6 were allocated/created during the period of time covered by snapshot S1, the owner parameter of data blocks B1-B6 is set to S1.

Turning now to FIG. 1D, once the region's VM has attempted to write to data block B5 (which is now read-only), a COW operation is executed that involves allocating a new writeable data block B5' from NVM device 102, copying the contents of B5 to B5', and writing the write data into B5'. Further, a new page table 140 for running point R is created that includes a new L1 page 142 pointing to new data block B5' (rather than existing data block B5), as well as a new root page 144 pointing to new L1 page 142. Note that new page table 140 continues to reference existing data blocks B1, B2, B3, B4, and B6 because there has been no modifications to those blocks. Since only snapshot S1 points to original data block B5 after this COW operation, the reference count parameter of block B5 is reduced to 1. In addition, the reference count parameter of new data block B5' is set to 1 and its owner is set to running point R. The VM can then continue accessing NVM region 120 using running point R, which now references new data block B5' via new page table 140. If the VM subsequently makes further modifications to NVM region 120, additional COWs will be performed, resulting in the allocation of new data blocks and potentially new pages in page table 140.

From FIG. 1D, it can be seen that running point R (and thus the VM using R to interact with NVM region 120) can no longer access data block B5 after the COW; the path from R to block B5 has been broken and only S1 can reach B5. This means that data block B5 is now a non-active block of NVM region 120. Such non-active blocks can never be read or written to by the region's VM, and thus are not on the critical path of the VM's execution. Instead, they can only be accessed from the context of a snapshot (for example, a higher-level management agent may use snapshot pointer S1 to access data block B5 and the other data blocks of this snapshot for a snapshot restore operation or other purposes). However, these non-active blocks still consume space on NVM device 102. With the accumulation of many snapshots over time, non-active blocks can potentially take up a large percentage of the space on NVM device 102, thereby significantly limiting the amount of NVM available for use by VMs 108(1)-(N) and other NVM clients.

Figure 2:
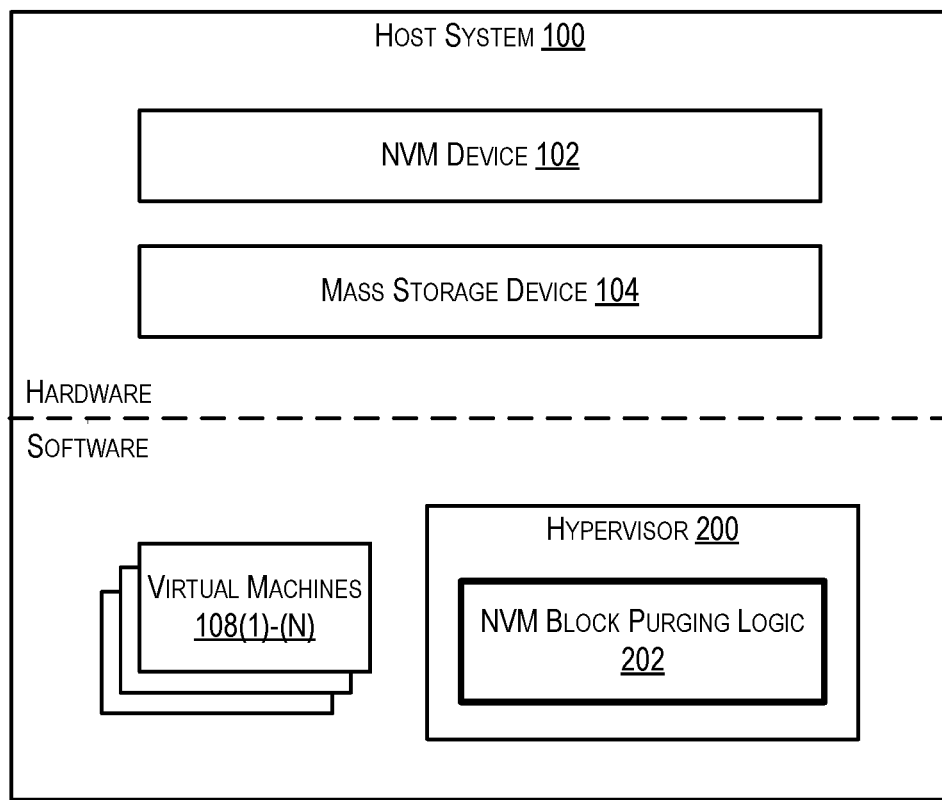
FIG. 2 depicts a host system that supports purging of non-active blocks from NVM according to an embodiment.

To address this problem, FIG. 2 depicts a modified version of host system 100 of FIG. 1 that includes an enhanced hypervisor 200 comprising novel NVM block purging logic 202. In various embodiments, enhanced hypervisor 200 can leverage logic 202 to efficiently move (i.e., purge) non-active blocks from NVM device 102 to, e.g., mass storage device 104 (or another high-capacity/low-cost storage or memory medium). In this way, hypervisor 200 can free up space on NVM device 102 that is consumed solely by snapshot data. If a higher-level management agent later needs to read the content of a region snapshot whose NVM data blocks have been purged to mass storage device 104, those blocks can simply be retrieved on demand.

In one set of embodiments, hypervisor 200 can implement a "virtblock" approach for purging non-active blocks that makes use of a new type of NVM region metadata structure referred to as a virtblock array. In another set of embodiments, hypervisor 200 can implement a "pointer elimination" approach that involves removing data block pointers from snapshot page tables at the time of purging. In yet another set of embodiments, hypervisor 200 can implement a "large page preservation" approach that purges non-active blocks in a manner that preserves large page allocations of contiguous NVM data blocks. Each of these approaches, which provide different advantages and trade-offs, are discussed in turn below.

2. Virtblock Approach

With the virtblock approach, hypervisor 200 of FIG. 2 can efficiently purge non-active blocks from NVM device 102 by using additional NVM space to maintain a per-snapshot or per-running point array known as a virtblock array. The size of each virtblock array is the number of NVM data blocks owned (i.e., created/allocated) by that snapshot or running point. Note that when a particular NVM block is allocated by a running point R and is subsequently frozen in a snapshot S, snapshot S is considered the owner of the data block. Each virtblock array is a pointer array comprising pointer entries (referred to herein as "virtblock entries" or "virtblock array entries") that sit between the L1 pages of each snapshot/running point and NVM data blocks and provide an extra level of indirection between these two entities. More particularly, each virtblock entry of a virtblock array is pointed to by an L1 page table entry of a snapshot/running point, and the virtblock entry in turn points to an NVM data block where the data corresponding to the L1 page table entry is stored. This extra level of indirection ensures that each NVM data block will only be directly pointed to by, at most, one pointer (i.e., a virtblock array entry pointer), which speeds up page table pointer updates at the time of purging.

Figure 3:
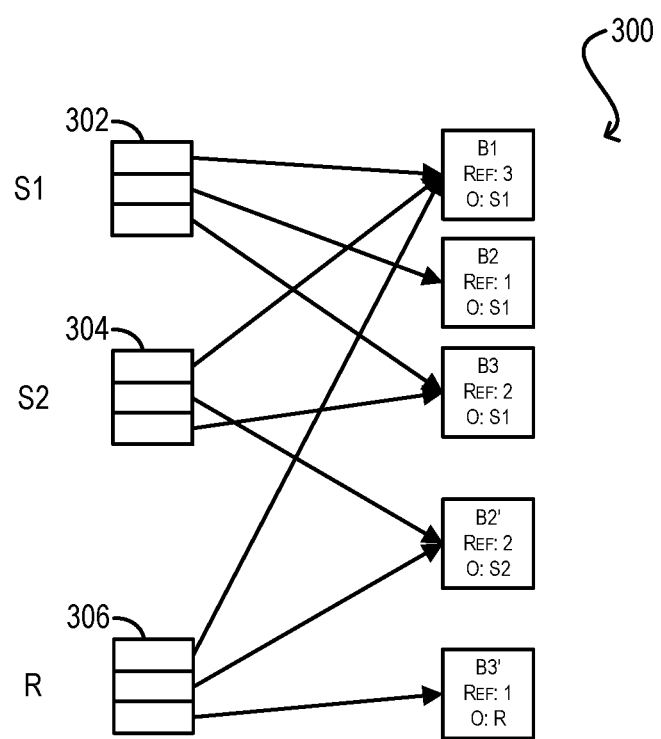
FIG. 3 is a schematic diagram illustrating an L1 page/data block structure for an example NVM region.

By way of example, consider schematic diagram 300 of FIG. 3, which depicts the L1 page/data block structure of two snapshots S1 and S2 and a running point R for an example NVM region 302. In this figure, virtblock arrays are not used. As shown, snapshot S1 comprises an L1 page 302, snapshot S2 comprises an L1 page 304, and running point R comprises an L1 page 306. The page table entries of L1 page 302 point to NVM data blocks B1, B2, and B3 respectively, the page table entries of L1 page 304 point to NVM data blocks B1, B2', and B3 respectively, and the page table entries of L1 page 306 point to NVM data blocks B1, B2', and B3' respectively. Blocks B1, B2, and B3 are owned by snapshot S1, block B2' is owned by snapshot S2, and block B3' is owned by running point R.

Since data blocks B2 and B3 of FIG. 3 are not referred/pointed to by running point R, they are non-active blocks that can be purged from NVM to mass storage. This purging process conventionally involves writing the data for the non-active blocks to storage locations (e.g., swap file slots) on a mass storage device and updating the L1 page table entries that point to the non-active blocks to instead point to/reference the storage locations (which allows the purged data to be later retrieved from mass storage when needed). However, as can be seen in FIG. 3, some data blocks like block B3 may be pointed to by multiple L1 page table entries that belong to different snapshots (i.e., snapshots S1 and S2). This potential one-to-many relationship between data blocks and L1 page table entries means that, at the time of purging each non-active block for an NVM region, the L1 page table entries of all snapshots for that region must be checked to determine whether they point to that block and, if so, must be updated to reference its purged storage location. If a large number of snapshots have been created for the region, this update process can take a significant amount of time.

Figure 4:
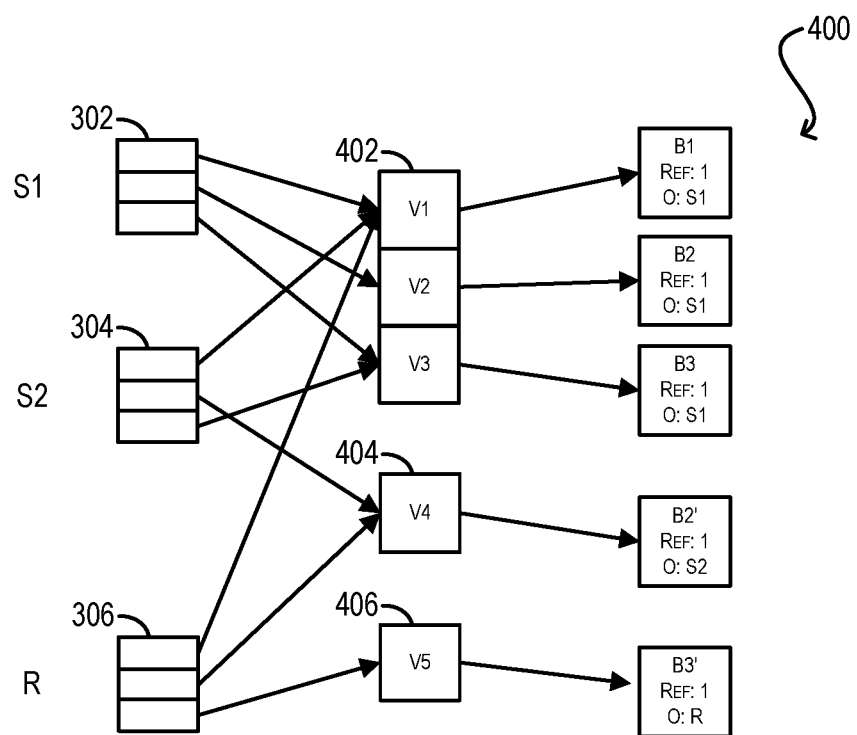
FIG. 4 is a schematic diagram illustrating the result of modifying the structure of FIG. 3 to use virtblock arrays according to an embodiment.

Consider now schematic diagram 400 of FIG. 4, which depicts the same NVM region 302 and corresponding snapshots S1/S2 and running point R, but makes use of virtblock arrays 402, 404, and 406. Virtblock array 402 belongs to snapshot S1, virtblock array 404 belongs to snapshot S2, and virtblock array 406 belongs to running point R. As shown in FIG. 4, these virtblock arrays are arrays of pointer entries (i.e., virtblock array entries) that add a level of indirection between L1 pages 302-306 and the NVM data blocks, such that the page table entries of L1 pages 302-306 point to virtblock array entries V1-V5. The virtblock array entries, in turn, point to the NVM data blocks.

Significantly, the multiple L1 page table entries that previously pointed to data block B3 in FIG. 3 now point to a single virtblock array entry V3, and single virtblock array entry V3 points to data block B3. Thus, virtblock arrays 402-406 convert each many-to-one mapping between L1 page table entries and data blocks into (1) a many-to-one mapping between L1 entries and virtblock array entries, and (2) a one-to-one mapping between virtblock array entries and data blocks. The end result of this is that the reference count parameter for each NVM data block is effectively reduced to 1, which significantly simplifies pointer updates during the purging process (since only a single pointer needs to be updated per purged non-active block).

The trade-offs of using the virtblock approach are that (1) it requires extra NVM space to store the virtblock arrays, (2) it does not help identify non-active blocks, and (3) it slightly increases the cost of COW (in order to setup a new virtblock array entry) and block access (due to the need to traverse one extra level of indirection in the region page table). With respect to (1), the upper bound on the size of the virtblock array for a given running point is the size of the NVM region itself (i.e., if the running point writes data into every page of the region's address space, a virtblock array entry will be created for each such address). Accordingly, the space complexity of the virtblock approach is $O(l \times |S|)$, where l is the size of the NVM region's address space and S is the number of snapshots created for the region.

Figure 5:
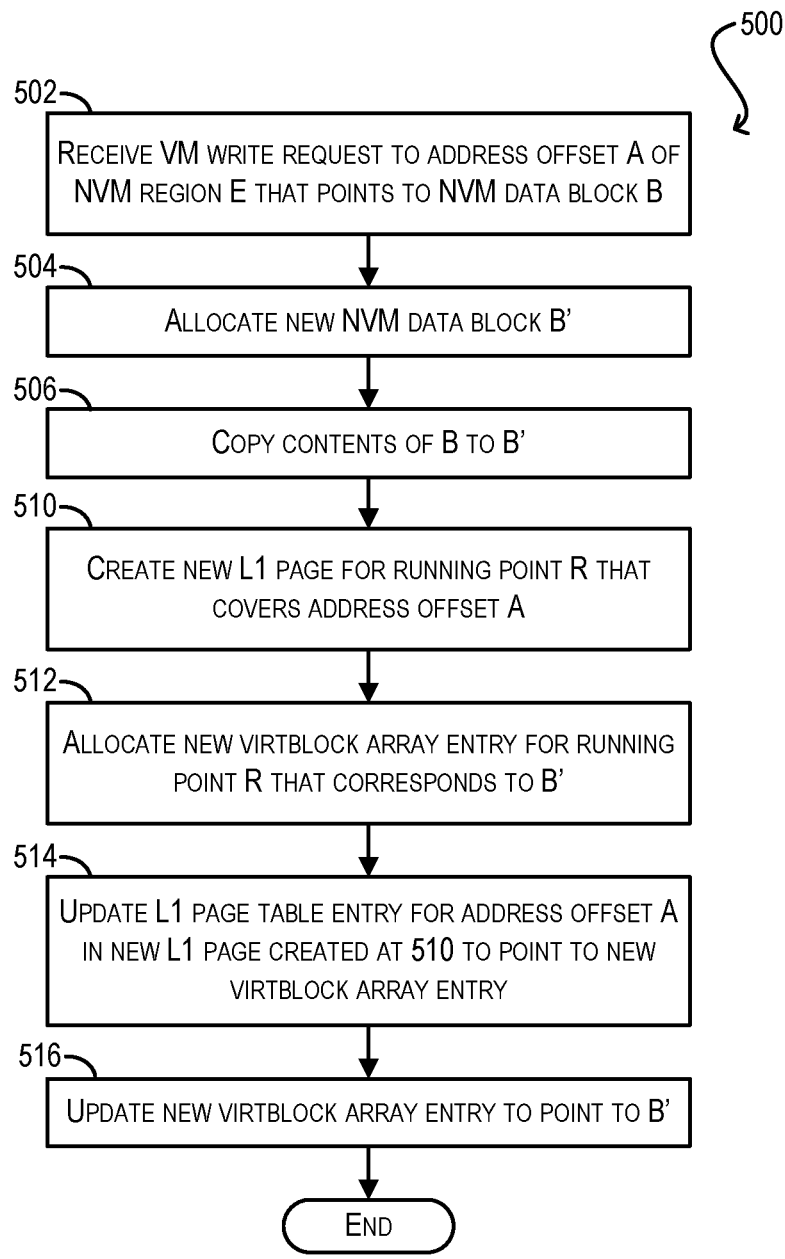
FIG. 5 depicts a workflow for executing a COW operation in accordance with the virtblock approach according to an embodiment.
Figure 6:
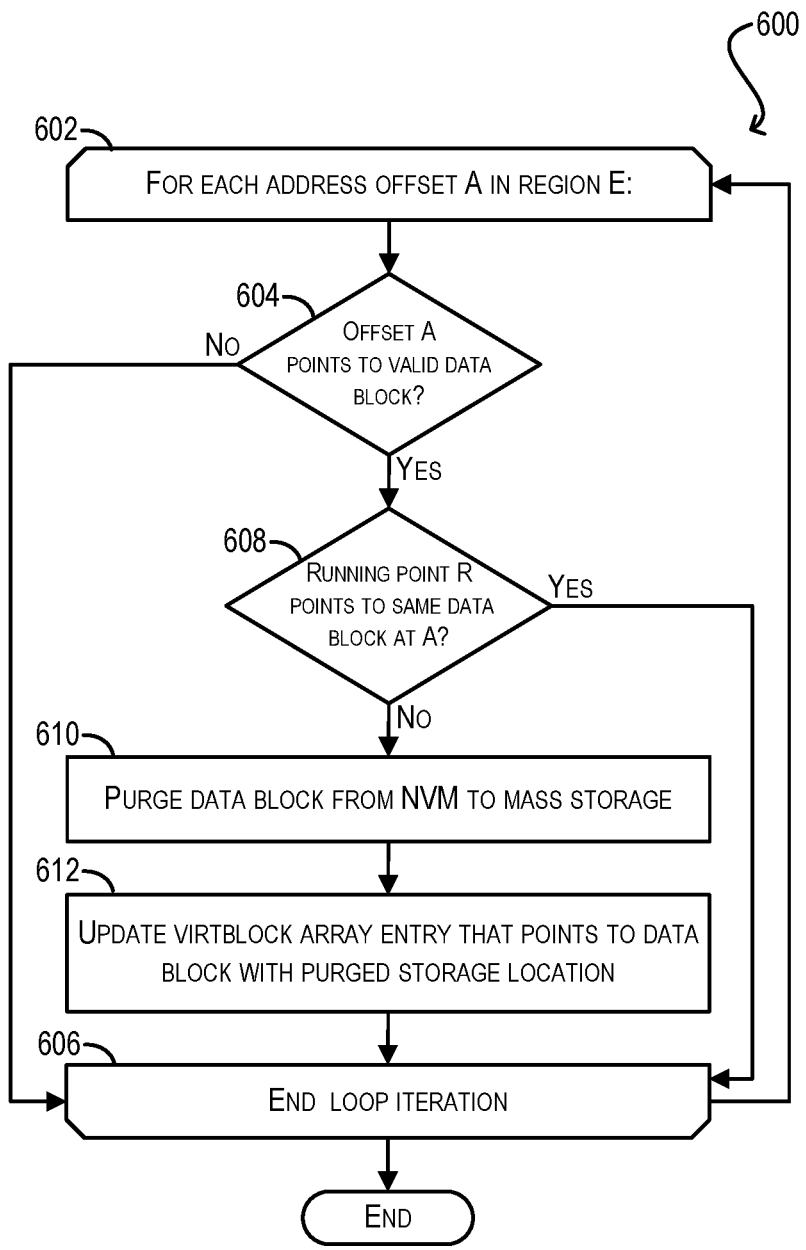
FIG. 6 depicts a workflow for executing a purge operation in accordance with the virtblock approach according to an embodiment.

The major changes required by the virtblock approach are in the COW operation—for allocating/setting up a new virtblock array entry for a newly allocated NVM data block—and the purge operation—for updating virtblock array entries with purged storage locations (block reads are also affected, but simply involve an extra pointer traversal and thus are not detailed here). Accordingly, FIG. 5 depicts a COW workflow 500 that can be executed by hypervisor 200 in accordance with the virtblock approach and FIG. 6 depicts a purge workflow 600 that can be executed by hypervisor 200 in accordance with the virtblock approach.

Starting with step 502 of COW workflow 500, hypervisor 200 can receive a VM write request to an address offset A of an NVM region E that points to an NVM data block B, where data block B is read-only as a result of being frozen in a previously-created snapshot for region E.

In response to the write request, hypervisor 200 can allocate a new NVM data block B' (step 504) and copy the contents of read-only block B into new block B' (step 506). Hypervisor 200 can also create a new L1 page in the page table of the region's running point R that covers address offset A (step 510) (this may also result in the chained creation of one or more additional page table pages up the page table tree for R).

At step 512, hypervisor 200 can allocate a new pointer entry (i.e., new virtblock array entry) in the virtblock array for running point R that corresponds to newly allocated data block B'. Finally, at steps 514 and 516, hypervisor 200 can update the page table entry for address offset A in the new L1 page created at block 510 to point to the new virtblock array entry and can update the new virtblock array entry to point to new data block B'.

Turning now to purge workflow 600 of FIG. 6, at step 602 hypervisor 200 can enter a loop for each address offset A in the logical address space of NVM region E. Within this loop, hypervisor 200 first can check whether address offset A points to a valid NVM data block in the page table of one or more snapshots taken for region E (step 604). If not, hypervisor 200 can skip to the end of the loop iteration (step 606) and proceed to the next address offset.

However, if hypervisor 200 determines that address offset A does point to a valid NVM data block in the page table of a particular snapshot S, hypervisor 200 can go on to check whether the page table of running point R of region E also points to the same data block at the same address offset A (step 608). If the answer is yes, hypervisor 200 can conclude that the data block is an active block and cannot be purged. Accordingly, hypervisor 200 can skip to the end of the current loop iteration and proceed to the next address offset.

On the other hand, if the answer at step 608 is no, hypervisor 200 can conclude that the data block is a non-active block and can be purged. Accordingly, at step 610 hypervisor 200 can purge the data block from NVM device 102 to mass storage device 104. This can involve, e.g., copying the contents of the data block to an available swap file slot on mass storage device 104. Finally, hypervisor 200 can update the virtblock array entry of snapshot S that points to the data block with the purged storage location (block 612) and the current loop iteration can end. Once all of the address offsets of region E have been processed per loop 602, the purge operation is considered complete (i.e., all non-active blocks of region E will have been identified and purged).

3. Pointer Elimination Approach

With the pointer elimination approach, hypervisor 200 of FIG. 2 can efficiently purge non-active data blocks of an NVM region by modifying the purge operation to (1) remove pointers from the region's snapshot page tables that point to non-active blocks and, for each purged non-active block, (2) update the page table of the block's owner snapshot to point to the purged storage location and (3) update the page tables of other snapshots that refer to the purged block but are non-owners to refer to the owner snapshot. This advantageously allows the purge operation to be completed via a single pass of the region's snapshot page tables, without taking up NVM space for additional metadata like the virtblock approach or requiring any virtblock management (e.g., allocation, updating, deleting, etc.). In addition, the pointer elimination approach does not require any changes to the way snapshot creation or COW works, which minimizes its impact on runtime VM performance.

By way of example, consider once again diagram 300 of FIG. 3, which depicts example NVM region 302 with snapshots S1 and S2 and running point R. Recall that the non-active blocks in this example are blocks B2 and B3. If region 302 of FIG. 3 is purged per the pointer elimination approach, the end result of the purge operation is illustrated in schematic diagram 700 of FIG. 7. As can be seen in diagram 700, the data content of blocks B2 and B3 has been purged to slots in swap file 702 and the L1 page table entries of S1 that previously pointed to B2 and B3 now point to the corresponding swap file slots. In addition, the L1 page table pointer of S2 that previously pointed to B3 has been removed and replaced with a flag "P" indicating that the purged storage location for the data at this address offset can be found in a parent snapshot page table (i.e., the page table of S1). This is because S1, rather than S2, is/was the owner of block B3. There are no changes to the L1 page of running point R, since the pointer elimination approach only traverses/modifies snapshot page tables, not the running point page table.

Figure 7:
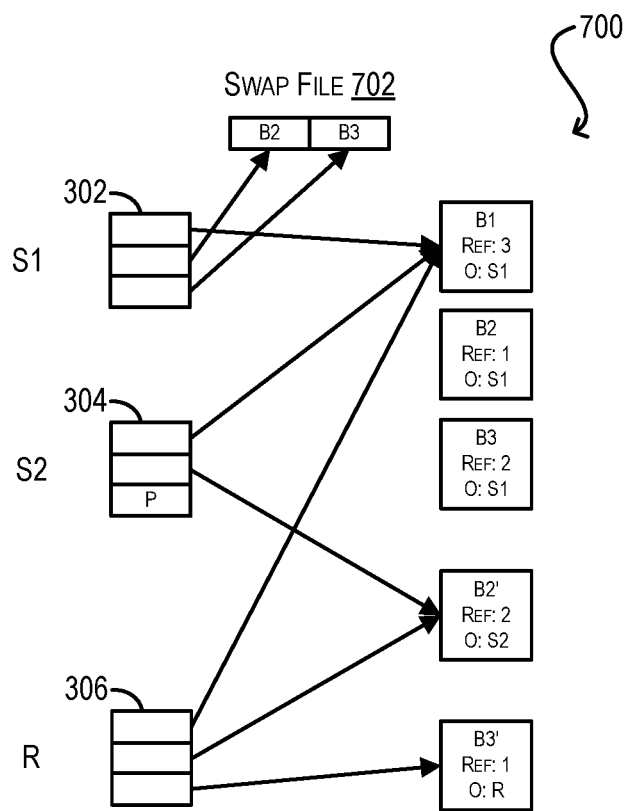
FIG. 7 is a schematic diagram illustrating the outcome of purging the example NVM region of FIG. 3 using the pointer elimination approach according to an embodiment.

The main trade-off with the pointer elimination approach is that, due to potential references between snapshots for purged data blocks (e.g., the flag "P" in the L1 page of snapshot S2 that refers to parent snapshot S1), snapshot deletion becomes more complex. For example, assume a request to delete snapshot S1 of FIG. 7 is received. In this case, the snapshot data maintained in swap file 702 for S1 cannot simply be deleted because snapshot S2 is dependent on the existence of this data. At the same time, there is no way to identify this dependency solely from examining the page table/metadata of snapshot S1; instead, the page tables of all other snapshots need to be checked to find such dependencies and adjust the delete process accordingly.

Having said that, this extra cost/overhead of performing snapshot deletion should not be too burdensome from a practical perspective for several reasons. First, snapshot deletion is typically performed infrequently and can be scheduled for offline execution at times that minimize its impact. Second, snapshot deletion is a relatively expensive operation anyway due to the need to perform other tasks (such updating the ownership of data blocks owned by the snapshot to be deleted), and thus the extra cost incurred for resolving the dependencies noted above does not dramatically increase the operation's algorithmic time complexity.

Figure 8:
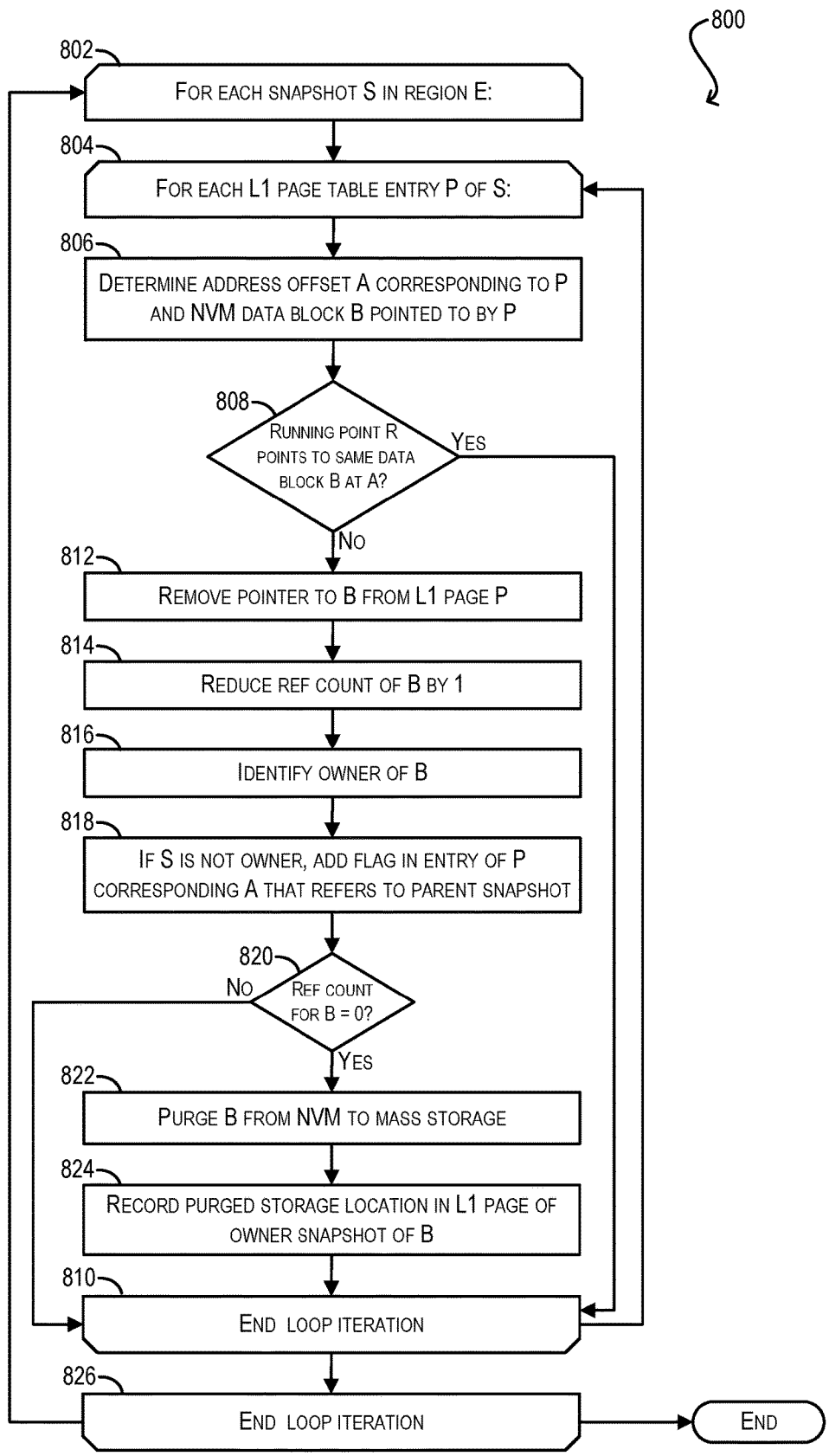
FIG. 8 depicts a workflow for executing a purge operation in accordance with the pointer elimination approach according to an embodiment.

FIG. 8 depicts a workflow 800 that can be executed by hypervisor 200 for purging non-active blocks of an NVM region E in accordance with the pointer elimination approach according to an embodiment. At step 802, hypervisor 200 can enter a first loop for each snapshot S of region E, from oldest to newest. Further, at block 804, hypervisor 200 can enter a second loop for each L1 page table entry P in the page table of snapshot S.

Within the second loop, hypervisor 200 can first determine the region address offset A corresponding to P and the NVM data block B pointed to by P (step 806). Hypervisor 200 can then check whether the running point R of region E also points to data block B at address offset A (step 808).

If R does point to data block B at address offset A, hypervisor 200 can conclude that data block B is an active block and cannot be purged. Thus, hypervisor 200 can skip to the end of the current loop iteration (step 810).

However, if R does not point to data block B at address offset A, hypervisor 200 can conclude that data block B is an non-active block and can proceed to remove the pointer to block B from L1 page P (step 812) and reduce the reference count parameter for data block B by 1 (step 814). Hypervisor 200 can further identify the owner of data block B (via the data block's owner parameter) (step 816) and, if snapshot S is not the owner, can add an indication/flag in the entry of P corresponding to address offset A which indicates that this entry points to a purged data block, but the storage location of block can be found in in the page table of a parent snapshot (step 818).

Upon performing steps 816 and 818, hypervisor 200 can check whether the reference count parameter for data block B is now zero (step 820). If the reference count is not zero, hypervisor 200 can conclude that one or more later snapshots of E are still pointing to data block B and can skip to the end of the current loop iteration.

But if the reference count has become zero at step 820, hypervisor 200 can conclude that no other snapshots are pointing to data block B and can thus purge the data block from NVM device 102 to mass storage device 104 (step 822). Finally, at step 824, hypervisor 200 can record the storage location of the purged data in the appropriate L1 page of the owner snapshot of block B (as determined at step 816). The current loop iteration can then end, and loops 804 and 802 can repeat as necessary until all L1 page table entries of all snapshots of region E have been processed. At the conclusion of these loops (steps 810 and 826) the purge operation is considered complete (i.e., all non-active blocks of region E will have been identified and purged).

4. Large Page Preservation Approach

In some implementations, at the time of allocating new data blocks in an NVM region the hypervisor will allocate the data blocks in contiguous chunks known as large pages. As used herein, a "large page" is an allocation of contiguous data blocks on a storage or memory medium such as NVM device 102 that is larger than a single data block. For example, if each data block on NVM device 102 is 4 KB in size, a large page may correspond to a contiguous chunk of 512 data blocks (resulting in a 2 MB large page). By allocating NVM data blocks in large pages, certain NVM operations can be accelerated due to the way in which these large pages can be cached on the hardware side. For instance, if each large page is made equal to the addressable size of an L1 page table page and these large pages are cached in the CPU TLB, the number of NVM pointer traversals needed to access a particular data block can be reduced by 1.

Generally speaking, the performance advantage provided by large pages requires the large pages to remain intact for the running point of a region. For example, if NVM data blocks B1, B2, and B3 are initially allocated as contiguous blocks of a single large page in an NVM region E used by a VM V, these allocations should not change during the runtime of V. If they do change (e.g., the data for block B2 is copied out to a separate block B2' that is not part of the same large page), the number of cache misses can increase and thus reduce or eliminate the performance advantage.

With the foregoing in mind, the large page preservation approach enables hypervisor 200 of FIG. 2 to implement non-active block purging in a manner that keeps large page allocations of NVM data blocks intact for a region's running point. This is achieved by modifying the way in which hypervisor 200 assigns pointers during the COW operation. In particular, at the time of a COW for a NVM data block that is referred to by one or more existing snapshots, the hypervisor can (1) make the page table of the running point of the region point to the existing instance of the data block, (2) make the page table of the snapshot that owns the data block point to the new data block that is allocated as a result of the COW, and (3) make the page tables of other snapshots that refer to the data block but are non-owners refer to the owner snapshot.

These modifications have two effects. First, assuming that NVM data blocks are initially allocated in the form of large pages, these modifications ensure that the large pages are not broken as a result of a COW; instead, the running point can continue referencing the original data blocks as initially allocated. Thus, the large pages are kept intact and the performance advantage arising from them is retained.

Second, the COW modifications above guarantee that each NVM data block in the region will be pointed to by, at most, the page table of the block's owner snapshot and the running point. This simplifies the updating of page table pointers during the purge operation, because if the reference count of an non-active block is 1 the hypervisor only needs to update a single L1 page table pointer at the time of purging that block (similar to the virtblock approach).

Figure 9A:
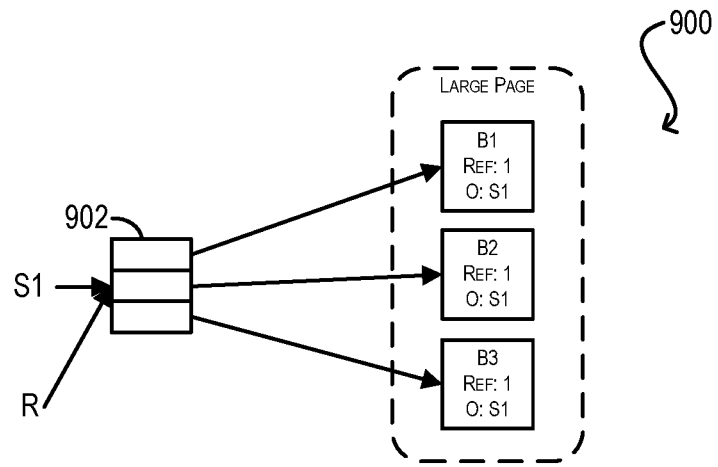
FIGS. 9A, 9B, and 9C are schematic diagrams illustrating the outcome of performing COWs in an example NVM region using the large page preservation approach according to an embodiment.
Figure 9B:
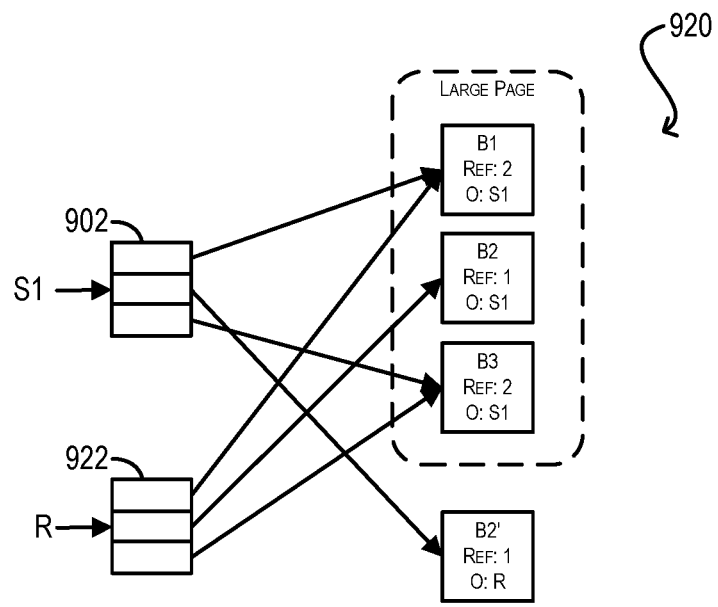
Figure 9C:
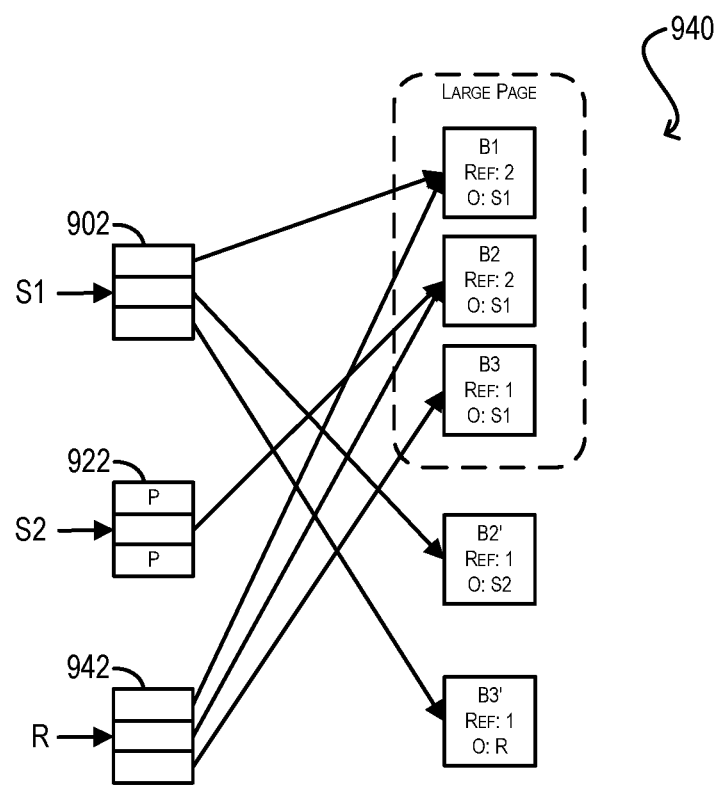

To better understand these concepts, consider diagrams 900, 920, and 940 of FIGS. 9A, 9B, and 9C. Diagram 900 of FIG. 9A depicts an initial L1 page/data block structure for an example NVM region comprising a snapshot S1 and a running point R. As shown, snapshot S1 includes an L1 page 902 with a first page table entry that points to NVM data block B1, and second entry that points to NVM data block B2, and a third entry that points to NVM data block B3. Data blocks B1, B2, and B3 are contiguous and part of a single large page. Running point R refers to the same L1 page 902 because no writes have been made yet to blocks B1-B3 via R.

Diagram 920 of FIG. 9B depicts the NVM region of FIG. 9A after a write is made to data block B2 and a COW is executed per the large page preservation approach. As depicted in diagram 920, a new NVM data block B2' is allocated and a new L1 page 922 is created for running point R. However, rather than having L1 page 922 of R point to new data block B2', L1 page 902 of snapshot S1 is made to point to block B2'. Further, L1 page 922 of R is made to point to original data block B2. This ensures that the large page comprising blocks B1-B3 is kept intact for running point R.

Finally, diagram 940 of FIG. 9C depicts the NVM region of FIG. 9B after (1) another snapshot S2 is taken, resulting in a new running point R, and (2) a write is made to data block B3 and a COW is executed per the large page preservation approach. As depicted in diagram 940, a new NVM data block B3' is allocated and a new L1 page 942 is created for current running point R. In addition, L1 page 942 of R is made to point to original data block B3, thereby preserving the large page again with respect to R.

But, instead of having L1 page 922 of snapshot S2 point to new data block B3', L1 page 902 of snapshot S1 is made to point to block B3. This is because snapshot S1 was the owner of original data block. Further, L1 page 922 of snapshot S2 is updated such that its entry corresponding to data block B3 now includes an indication/flag "P" indicating that the appropriate pointer for this entry can be found in a parent snapshot (i.e., snapshot S1). This guarantees that every data block in the NVM region is only pointed to by the page table of its owner or the running point, which as mentioned previously facilitates non-active block determination during the purge operation.

The trade-offs of the large page preservation approach are that it makes the COW operation a bit more expensive and it complicates snapshot deletion in a manner similar to the pointer elimination approach. However, these trade-offs can be considered reasonable in view of the performance benefits achieved for the VM/running point due to large page preservation.

Figure 10:
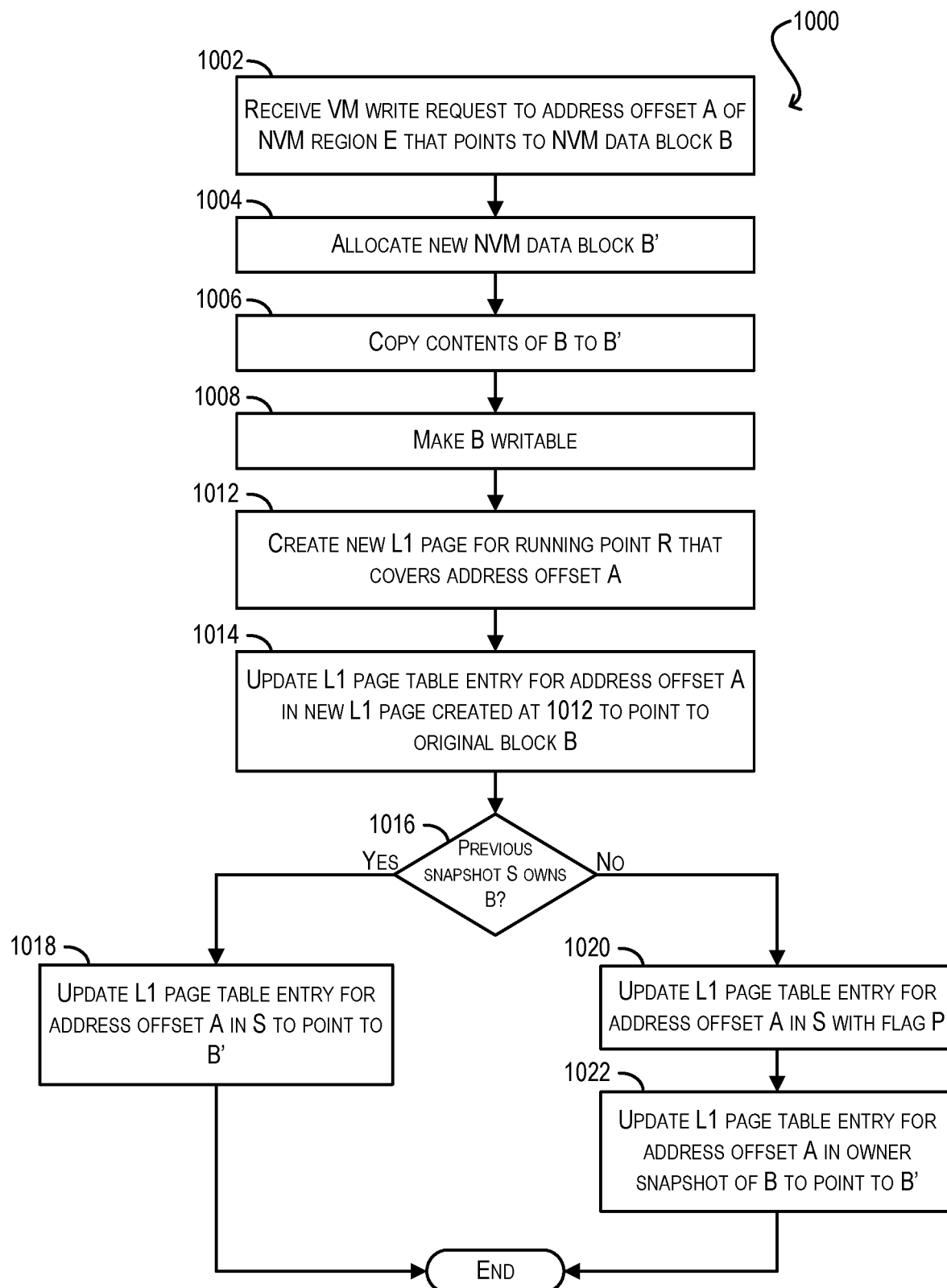
FIG. 10 depicts a workflow for executing a COW operation in accordance with the large page preservation approach according to an embodiment.
Figure 11:
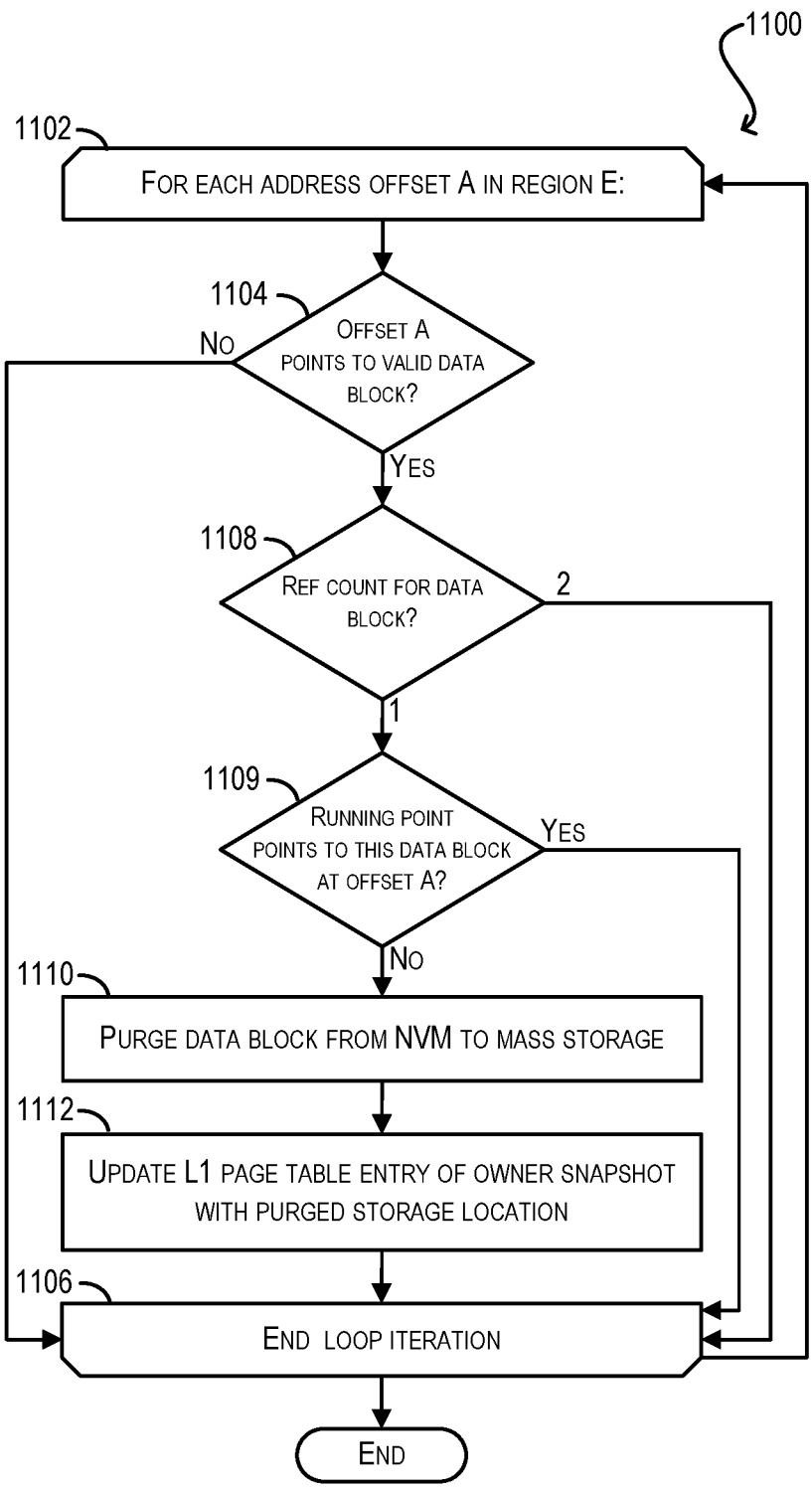
FIG. 11 depicts a workflow for executing a purge operation in accordance with the large page preservation approach according to an embodiment.

Since the major changes required by the large page preservation approach are in the COW operation and the purge operation, FIG. 10 depicts a COW workflow 1000 that can be executed by hypervisor 200 in accordance with this approach and FIG. 11 depicts a purge workflow 1100 that can be executed by hypervisor 200 in accordance with this approach.

Starting with step 1002 of COW workflow 1000, hypervisor 200 can receive a VM write request to an address offset A of an NVM region E that points to an NVM data block B, where data block B is read-only as a result of being frozen in a previously-created snapshot for region E.

In response to the write request, hypervisor 200 can allocate a new NVM data block B' (step 1004), copy the contents of original block B into new block B' (step 1006), and make original block B writeable once more (step 1008). Hypervisor 200 can also create a new L1 page in the page table of the region's running point R that covers address offset A (step 1012) (this may also result in the chained creation of one or more additional page table pages up the page table tree for R).

At step 1014, hypervisor 200 can update the page table entry for address offset A in the new L1 page created at block 1012 to point to original block B. In addition, at step 1016, hypervisor 200 can check whether immediately previous snapshot S is the owner of original block B. If so, hypervisor 200 can update the L1 page table entry for address offset A in snapshot S to point to new data block B' (step 1018). Otherwise, hypervisor 200 can update that page table entry with the indication/flag "P" (step 1020) and update the L1 page table entry for address offset A in the owner snapshot of block B to point to new data block B' (step 1022).

Turning now to purge workflow 1100 of FIG. 11, at step 1102 hypervisor 200 can enter a loop for each address offset A in the logical address space of NVM region E. Within this loop, hypervisor 200 first can check whether address offset A points to a valid NVM data block in the page table of one or more snapshots taken for region E (step 1104). If not, hypervisor 200 can skip to the end of the loop iteration (step 1106) and proceed to the next address offset.

However, if hypervisor 200 determines that address offset A does point to a valid NVM data block in the page table of a particular snapshot S, hypervisor 200 can check the reference count parameter for the data block (step 1108). If the reference count is 2, hypervisor 200 can conclude that the data block is an active block and cannot be purged. Accordingly, hypervisor 200 can skip to the end of the current loop iteration and proceed to the next address offset.

On the other hand, if the reference count is 1, hypervisor 200 can check whether the running point also points to this same data block at address offset A (step 1109). If so, the data block is active and hypervisor 200 can skip to the end of the current loop iteration. However, if the running point does not point to this same data block, hypervisor 200 can conclude that the data block is a non-active block and can be purged. Accordingly, at step 1110 hypervisor 200 can purge the data block from NVM device 102 to mass storage device 104. This can involve, e.g., copying the contents of the data block to an available swap file slot on mass storage device 104. Finally, hypervisor 200 can update the L1 page table entry of the snapshot that owns the data block with the purged storage location (block 1112) and the current loop iteration can end. Once all of the address offsets of region E have been processed per loop 1102, the purge operation is considered complete (i.e., all non-active blocks of region E will have been identified and purged).

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for purging non-active blocks in a non-volatile random access memory (NVM) region of an NVM device using pointer elimination, the method comprising, for each level 1 (L1) page table entry of each snapshot of the NVM region:
   determining, by a host system, whether a data block of the NVM region that is pointed to by the L1 page table entry is a non-active block which cannot be read or written to via a running point of the NVM region; and
   if the data block is a non-active block:
   removing, by the host system, a pointer to the data block in the L1 page table entry;
   reducing, by the host system, a reference count parameter associated with the data block by 1; and
   if the reference count parameter has reached zero, purging, by the host system, the data block from the NVM device to a mass storage device.

2. The method of claim 1 wherein determining whether the data block is a non-active block comprises:
   determining an address offset of the NVM region that corresponds to the L1 page table entry; and
   determining whether an L1 page table entry of the running point of the NVM region also points to the data block at the address offset.

3. The method of claim 1 wherein the reference count parameter identifies a total number of L1 page table entries that point to the data block.

4. The method of claim 1 further comprising, prior to removing the pointer:
   identifying an owner snapshot of the data block, where the owner snapshot is a snapshot of the NVM region in which the data block was first created.

5. The method of claim 4 further comprising:
   if a current snapshot is not the owner snapshot, adding a flag to the L1 page table entry indicating that a storage location for the data block can be found in a page table of a parent snapshot.

6. The method of claim 4 further comprising:
   recording a purged storage location for the data block in the mass storage device in an L1 page table entry of the owner snapshot.

7. A non-transitory computer readable storage medium having stored thereon program code executable by a host system, the program code embodying a method for purging non-active blocks in a non-volatile random access memory (NVM) region of an NVM device using pointer elimination, the method comprising, for each level 1 (L1) page table entry of each snapshot of the NVM region:
   determining whether a data block of the NVM region that is pointed to by the L1 page table entry is a non-active block which cannot be read or written to via a running point of the NVM region; and
   if the data block is a non-active block:
   removing a pointer to the data block in the L1 page table entry;
   reducing a reference count parameter associated with the data block by 1; and
   if the reference count parameter has reached zero, purging the data block from the NVM device to a mass storage device.

8. The non-transitory computer readable storage medium of claim 7 wherein determining whether the data block is a non-active block comprises:
   determining an address offset of the NVM region that corresponds to the L1 page table entry; and
   determining whether an L1 page table entry of the running point of the NVM region also points to the data block at the address offset.

9. The non-transitory computer readable storage medium of claim 7 wherein the reference count parameter identifies a total number of L1 page table entries that point to the data block.

10. The non-transitory computer readable storage medium of claim 9 wherein the method further comprises, prior to removing the pointer:
    identifying an owner snapshot of the data block, where the owner snapshot is a snapshot of the NVM region in which the data block was first created.

11. The non-transitory computer readable storage medium of claim 10 wherein the method further comprises:
    if a current snapshot is not the owner snapshot, adding a flag to the L1 page table entry indicating that a storage location for the data block can be found in a page table of a parent snapshot.

12. The non-transitory computer readable storage medium of claim 10 wherein the method further comprises:
  recording a purged storage location for the data block in the mass storage device in an L1 page table entry of the owner snapshot.

13. A host system comprising:
  a non-volatile random access memory (NVM) device;
  a mass storage device;
  a processor; and
  a non-transitory computer readable storage medium having stored thereon program code that, when executed, causes the processor to, for each level 1 (L1) page table entry of each snapshot of an NVM region of the NVM device:
    determine whether a data block of the NVM region that is pointed to by the L1 page table entry is a non-active block which cannot be read or written to via a running point of the NVM region; and
    if the data block is a non-active block:
      remove a pointer to the data block in the L1 page table entry;
      reduce a reference count parameter associated with the data block by 1; and
      if the reference count parameter has reached zero, purge the data block from the NVM device to the mass storage device.

14. The host system of claim 13 wherein determining whether the data block is a non-active block comprises:
  determining an address offset of the NVM region that corresponds to the L1 page table entry; and
  determining whether an L1 page table entry of the running point of the NVM region also points to the data block at the address offset.

15. The host system of claim 13 wherein the reference count parameter identifies a total number of L1 page table entries that point to the data block.

16. The host system of claim 15 wherein the program code further causes the processor to, prior to removing the pointer:
  identify an owner snapshot of the data block, where the owner snapshot is a snapshot of the NVM region in which the data block was first created.

17. The host system of claim 16 wherein the program code further causes the processor to:
  if a current snapshot is not the owner snapshot, add a flag to the L1 page table entry indicating that a storage location for the data block can be found in a page table of a parent snapshot.

18. The host system of claim 16 wherein the program code further causes the processor to:
  record a purged storage location for the data block in the mass storage device in an L1 page table entry of the owner snapshot.

* * * * *